(12) United States Patent
Thomas

(10) Patent No.: US 8,504,673 B2
(45) Date of Patent: Aug. 6, 2013

(54) TRAFFIC LIKE NXDOMAINS

(75) Inventor: Matthew Thomas, Lausanne (CH)

(73) Assignee: Verisign, Inc., Reston, VA (US)

( * ) Notice: Subject to any disclaimer, the term of this patent is extended or adjusted under 35 U.S.C. 154(b) by 158 days.

(21) Appl. No.: 13/076,633

(22) Filed: Mar. 31, 2011

(65) Prior Publication Data

US 2012/0254398 A1 Oct. 4, 2012

(51) Int. Cl.
*G06F 15/173* (2006.01)

(52) U.S. Cl.
USPC ............ 709/223; 709/224; 709/245; 726/22; 726/23

(58) Field of Classification Search
USPC ........................ 709/223, 224, 245; 726/22, 23
See application file for complete search history.

(56) References Cited

U.S. PATENT DOCUMENTS

| | | | |
|---|---|---|---|
| 5,892,919 A | 4/1999 | Nielsen et al. | |
| 6,594,697 B1 | 7/2003 | Praitis et al. | |
| 6,687,734 B1 | 2/2004 | Sellink et al. | |
| 7,325,045 B1 | 1/2008 | Manber et al. | |
| 7,366,718 B1 | 4/2008 | Pugh et al. | |
| 7,376,752 B1 | 5/2008 | Chudnovsky et al. | |
| 7,519,679 B2 | 4/2009 | Kale et al. | |
| 7,779,002 B1 | 8/2010 | Gomes et al. | |
| 7,805,379 B1 | 9/2010 | Adkins, III et al. | |
| 7,853,719 B1 | 12/2010 | Cao et al. | |
| 2007/0033264 A1 | 2/2007 | Edge et al. | |
| 2009/0222584 A1* | 9/2009 | Josefsberg et al. | 709/245 |
| 2010/0100957 A1* | 4/2010 | Graham et al. | 726/22 |
| 2011/0225284 A1* | 9/2011 | Savolainen | 709/223 |
| 2012/0084860 A1* | 4/2012 | Cao et al. | 726/23 |

FOREIGN PATENT DOCUMENTS

WO WO 2007111470 A2 * 10/2007

OTHER PUBLICATIONS

Villamarin-Salomon, R. and Brustoloni, J.C., "Identifying Botnets Using Anomaly Detection Techniques Applied to DNS Traffic," Consumer Communications and Networking Conference, Jan. 2008, pp. 476-481, 5th IEEE.
Yuchi, X., et al., "A New Statistical Approach to DNS Traffic Anomaly Detection," Lecture Notes in Computer Science, Nov. 2010, pp. 302-313, vol. 6441/2010, Advanced Data Mining and Applications.
Bernát, D., "Domain Name System as a Memory and Communication Medium," Lecture Notes in Computer Science, Jan. 2008, pp. 560-571, vol. 4910/2008, Theory and Practice of Computer Science.
Villamarín-Salomón, R. and Brustoloni, J., "Bayesian Bot Detection Based on DNS Traffic Similarity," SAC '09 Proceedings of the 2009 ACM symposium on Applied Computing, held Mar. 8-12, 2009, ACM: 978-1-60558-166-8/09/03.

* cited by examiner

*Primary Examiner* — Kyung H Shin
(74) *Attorney, Agent, or Firm* — MH2 Technology Law Group, LLP

(57) ABSTRACT

Methods and systems for analyzing network traffic related to domain names, including Non-Existent Domain names, comprise: storing network traffic data associated with DNS requests for NXDs; receiving an analysis request associated with a domain name; creating, based on the stored network traffic data, an NXD list comprising NXDs that received at least one DNS request during a specified time period; computing, based on the stored network traffic data, a similarity metric for each NXD listed in the NXD list; and providing an analysis report identifying potentially valuable NXDs based on the computed similarity metrics.

22 Claims, 9 Drawing Sheets

TRAFFIC LIKE NXDOMAINS

DESCRIPTION OF THE INVENTION

1. Field of the Invention

The present disclosure relates generally to methods and systems for analyzing network traffic related to domains, including Non-Existent Domains.

2. Background of the Invention

The Domain Name System ("DNS") is a hierarchical naming system for devices connected to the Internet and is built on databases distributed across a plurality of DNS servers. Its primary purpose is to translate user-friendly domain names to the Internet Protocol ("IP") addresses used by devices connected to the Internet. When a DNS request is made for a domain name, such as when a user types in a URL address to find a specific Internet site, the request travels up the hierarchical system of servers until the IP address corresponding to the domain name is located and/or the request reaches the top level of servers that form the DNS. If an entry for the requested domain name is found, a DNS reply is issued containing the appropriate IP address to the requestor.

Non-existent domain (NXD) names are domain names that cannot be resolved using DNS, usually because they are not registered within a given domain registry. A user, however, can still issue DNS requests for NXDs. This happens, for example, when a user misspells the URL address of an Internet site that he or she wishes to visit. The resulting DNS request, because the domain does not exist, will travel all the way up the DNS hierarchal levels to reach the root name server for the associated Top-Level Domain (.com, .org, .edu, etc.). Of note, although the root name server will issue a DNS reply indicating that the requested domain name does not exist, it also logs the DNS request and the information contained therein.

Maintaining and interpreting records related to user requests for domains can be valuable for several reasons. For example, companies and individuals known as "domainers" regularly buy and sell domain names to earn a profit. These domainers generate income through domain parking and/or website development, as well as domain reselling, but typically rely on revenue generated from advertising click-through traffic. Thus, domainers desire NXDs exhibiting high Internet traffic in order to buy and register those NXDs.

Using current systems, domainers must blindly request and then review information regarding DNS requests associated with a set of NXDs in order to identify the high-traffic NXDs. After reviewing the requested information, the domainer will purchase a subset of the NXDs considered high-traffic and establish a web site for each of these domain names. Once the domainer has purchased a domain name and establishes a monetization mechanism, such as a website, they are able to collect and analyze additional information related to the site's positive traffic, such as unique visits, click-traffic, and other indicators of site performance. Using this information regarding a site's positive traffic, the domainer can better identify valuable domain names and generate revenue from them by, for instance, placing advertisements on such sites.

Currently, however, no system exists that enables domainers to capitalize on the collected positive traffic information to find additional NXDs of value. Instead, domainers must repeat the process of blindly requesting and reviewing NXD information, purchasing a subset of the NXDs, establishing sites for the associated domain names, and observing the positive traffic for these new sites. Thus, domainers are currently unable to leverage the discovery of a valuable domain name to find additional NXDs expected to exhibit similar traffic patterns. Therefore, a need exists for a tool able to suggest NXDs with DNS traffic similar to an identified domain name.

Similarly, companies who already own domains may wish to find other registered domains that exhibit similar traffic patterns of its own. For example, a company may wish to know what other domains their customers visit in order best place their advertisements. Accordingly, a need also exists for a tool able to provide customers with registered domain names exhibiting similar traffic patterns to a specified domain name.

SUMMARY OF THE INVENTION

Disclosed embodiments provide methods and systems for identifying potentially valuable domain names, including Non-Existent Domain (NXD) names. Disclosed embodiments include methods and systems for collecting network traffic information, analyzing network traffic information, isolating traffic relating to certain types of DNS traffic, and determining the DNS traffic similarity of two or more domains.

In one embodiment, a tool implementing the invention may store network traffic information and, upon receiving a domain analysis request, create a list of domain names exhibiting similar network traffic patterns. In some embodiments, similarity is determined in response to an analysis request and depicted by similarity metrics. In other embodiments, the similarly metrics may be pre-computed.

In another embodiment, a tool implementing the invention will first receive an analysis request that includes at least (i) one or more domain names and (ii) a specified time period during which the domain name(s) was an NXD. The tool then retrieves and analyzes previously logged DNS data associated with domain requests for all domains requested during the identified time period. Similarity metrics are then computed for each of the requested domains using one of several available statistical methods. Regardless of the method employed, the similarity metric for each NXD indicates the degree to which the domains' DNS traffic resembles the DNS traffic of the customer-identified domain name(s). The domains are then sorted and/or filtered, based on the determined similarity metrics, and provided to the customer.

In another embodiment, the tool may compute similarity metrics based on the IP addresses of the last name servers making the DNS requests for NXDs. The more IP addresses that an NXD and the customer-identified domain name have in common, the more similar the tool considers their respective DNS traffic. In another embodiment, the tool may additionally consider the time that the last name server made the request. Further, the similarity metrics may be (i) computed in response to a request, wherein the similarity values depict the similarity of each NXD relative to a specified domain name or (ii) pre-computed as hash values for each NXD depicting the fingerprint/signature of the NXDs, wherein closer hash values represent more similar DNS traffic.

Using these techniques and/or variations derived from these techniques, users may identify domains that exhibited DNS traffic patterns similar to sites identified as high traffic. Thus, companies are able to leverage the discovery domain names of interest to find and purchase similar domain names.

Although the invention is contemplated pilmarily in the context of NXDs, it can also be applied to the positive domain traffic of registered domain names, the identification of domains exhibiting bot-like traffic, or the detection of malware. Indeed, those skilled in the art will appreciate that the invention can be applied to resolution requests for any textual identifier, such as telephone numbers, etc.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and, together with the description, serve to explain the principles of the invention. In the drawings.

DESCRIPTION OF THE EMBODIMENTS

Figure 1:
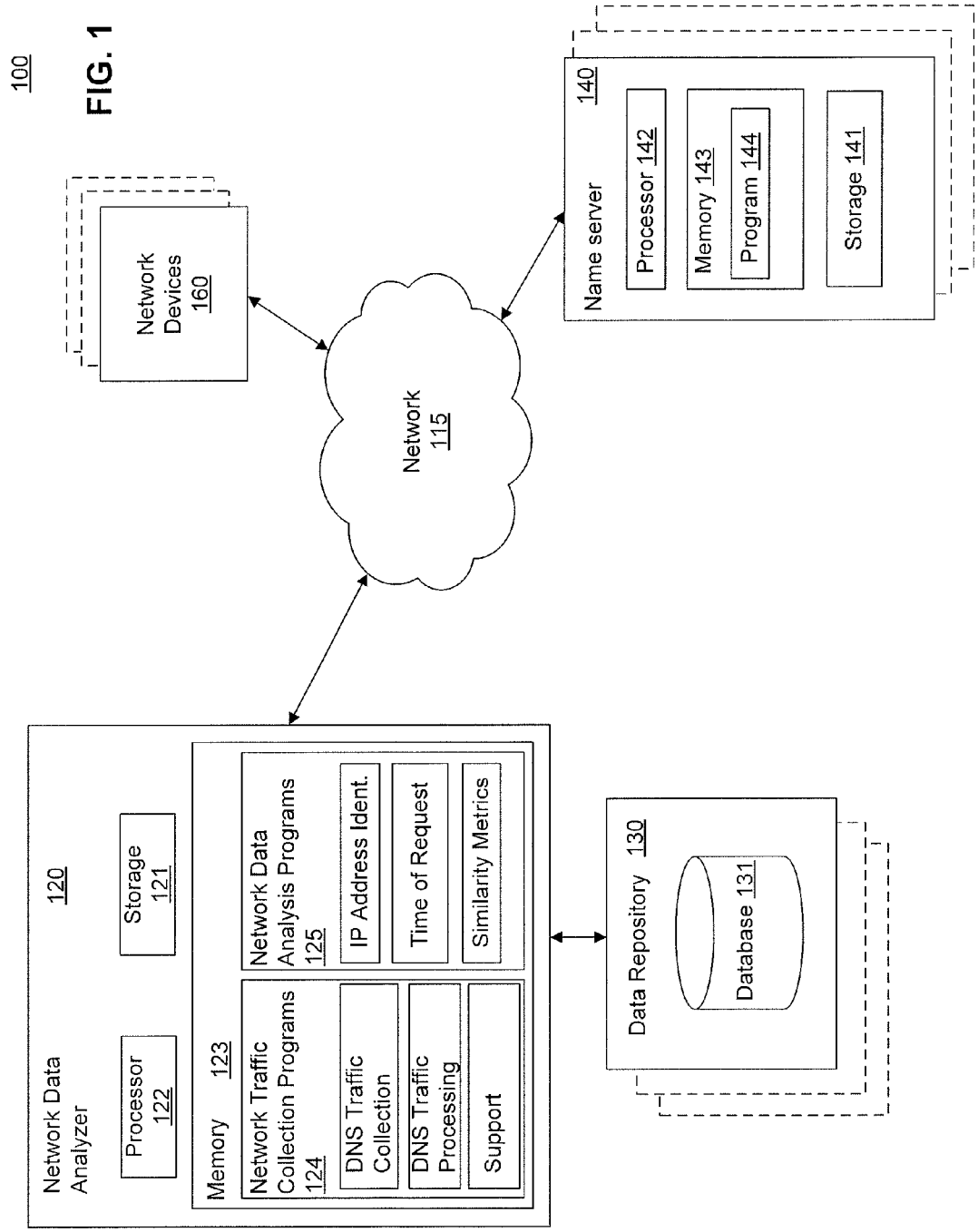
FIG. 1 is a diagram illustrating an exemplary system for identifying potentially valuable domain names that may be used to implement disclosed embodiments.

The following detailed description refers to the accompanying drawings. Whenever possible, the same reference numbers are used in the drawing and the following description to refer to the same or similar parts. While several exemplary embodiments and features of the invention are described herein, modifications, adaptations, and other implementations are possible, without departing from the spirit and scope of the invention. Instead, the proper scope of the invention is defined by the appended claims.

FIG. 1 is a diagram illustrating system 100 for identifying potentially valuable NXD names consistent with disclosed embodiments, including exemplary system components. The components and arrangement, however, may vary. Network data analyzer server 120 may include a processor 122, a memory 123, input/output (I/O) devices (not shown), and storage 121. The network data analyzer server 120 may be implemented in various ways. For example, it may take the form of a general purpose computer, a server, a mainframe computer, or any combination of these components. In some embodiments, network data analyzer server 120 may include a cluster of servers capable of performing distributed data analysis, e.g., using Google's MapReduce™ framework.

Network data analyzer server 120 may communicate over a link with network 115. For example, the link may constitute a direct communication link, a LAN, a WAN, or other suitable connection. Network 115 may include the Internet. Network data analyzer server 120 may be standalone, or it may be part of a subsystem, which may, in turn, be part of a larger system.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In some embodiments, memory 123 may include one or more network traffic collection programs or subprograms 124 loaded from storage 121 or elsewhere that, when executed by network data analyzer server 120, perform various procedures, operations, or processes consistent with disclosed embodiments. In one embodiment, memory 123 may include a network traffic collection program 124 that monitors network traffic associated with network requests and responses; logs data associated with domain traffic; processes the stored data associated with domain traffic; processes queries for the stored data; and an integrative support program that links the other programs, allowing them to use a common database, provides a common user interface, performs basic bookkeeping tasks, and provides user guidance and help.

As discussed above, in some embodiments, network data analyzer server 120 may include a cluster of servers capable of performing distributed data analysis. In these embodiments, network data analysis programs 124 may support distributed computing frameworks, e.g., Google's MapReduce framework, etc.

Methods, systems, and articles of manufacture consistent with disclosed embodiments are not limited to separate programs or computers configured to perform dedicated tasks. For example, memory 123 may be configured with a network data analysis program 125 that performs several functions when executed by processor 122. For example, memory 123 may include a single program 125 that performs the functions of the network data analysis system, or program 125 could comprise multiple programs. Moreover, processor 122 may execute one or more programs located remotely from network data analyzer server 120. For example, network data analyzer server 120 may access one or more remote programs that, when executed, perform functions related to disclosed embodiments.

Memory 123 may be also be configured with an operating system (not shown) that performs several functions well known in the art when executed by network data analyzer server 120. By way of example, the operating system may be Microsoft Windows™, Unix™, Linux™, Solaris™, or some other operating system. The choice of operating system, and even the use of an operating system, is not critical to any embodiment.

Network data analyzer server 120 may include one or more I/O devices (not shown) that allow data to be received and/or transmitted by network data analyzer server 120. I/O devices may also include one or more digital and/or analog communication input/output devices that allow network data analyzer server 120 to communicate with other machines and devices, such as name server 140 or any number of network devices 160. Network devices 160 may generate the network traffic monitored by network data analyzer 120 or provide requests from users representing queries of the data stored in storage 121 or data repository 130. Network data analyzer server 120 may receive data from external machines and devices and output data to external machines and devices via I/O devices. The configuration and number of input and/or output devices incorporated in I/O devices may vary as appropriate for certain embodiments.

Network data analyzer server 120 may also be communicatively connected to one or more data repositories 130, e.g., through network 115. Data repository 130 may include one or more files or databases 131 that store information and are accessed and/or managed through network data analyzer server 120. By way of example, the databases may be Oracle™ databases, Sybase™ databases or other relational databases, or non-relational databases, such as Hadoop sequence files, HBase or Cassandra. The databases or other files may include, for example, data and information related to the source and destination of a network request, the data contained in the request, etc. Systems and methods of disclosed embodiments, however, are not limited to separate databases.

FIG. 1 shows network data analyzer server 120 including both network traffic collection programs 124 and network data analysis programs 125. In some embodiments, however, network data analyzer server 120 may not include network traffic collection programs 124. For example, in some embodiments, another server may perform network data collection and formatting procedures consistent with the procedures performed by network traffic collection programs 124. In these embodiments, network data analyzer server 120 may retrieve the formatted data from the other server or from a database, such as database 131, and perform the analysis on this data using network data analysis programs 125.

Network data analyzer server 120 may be communicatively connected to one or more name servers 140 through network 115. In some embodiments, name server 140 may be owned or operated by a root name server operator. Name server 140 may process DNS packet requests, which may be sent by one or more network devices 160, and store information about the requests. Name server 140 may include a processor 142, a storage 141, and a memory 143. Storage 141 may be a volatile or non-volatile, magnetic, semiconductor, tape, optical, removable, nonremovable, or other type of storage device or computer-readable medium and may contain the stored information about the DNS requests. In some disclosed embodiments, memory 143 may include one or more collection programs or subprograms 144 loaded from storage 141 or elsewhere that, when executed by name server 140, read and extract data regarding network traffic and send the extracted data to network data analyzer server 120 or to another server that performs network data collection. Alternatively, programs 144 may include a program that allows network data analyzer server 120 or another server to access data stored at name server 140.

One or more network devices 160 may be communicatively connected to name server 140 via network 115. Network devices 160 may make various requests to name server 140 and to other servers via network routers, switches, or other network devices. For example, network devices 160 may make DNS requests to name server 140 in an effort to resolve IP addresses for domains. The term "domain" may refer to, for example, registered domain names or Non-Existent Domain (NXD) names. Similarly, in some embodiments, a network router may forward data packets related to requests for application or web servers.

Figure 2:
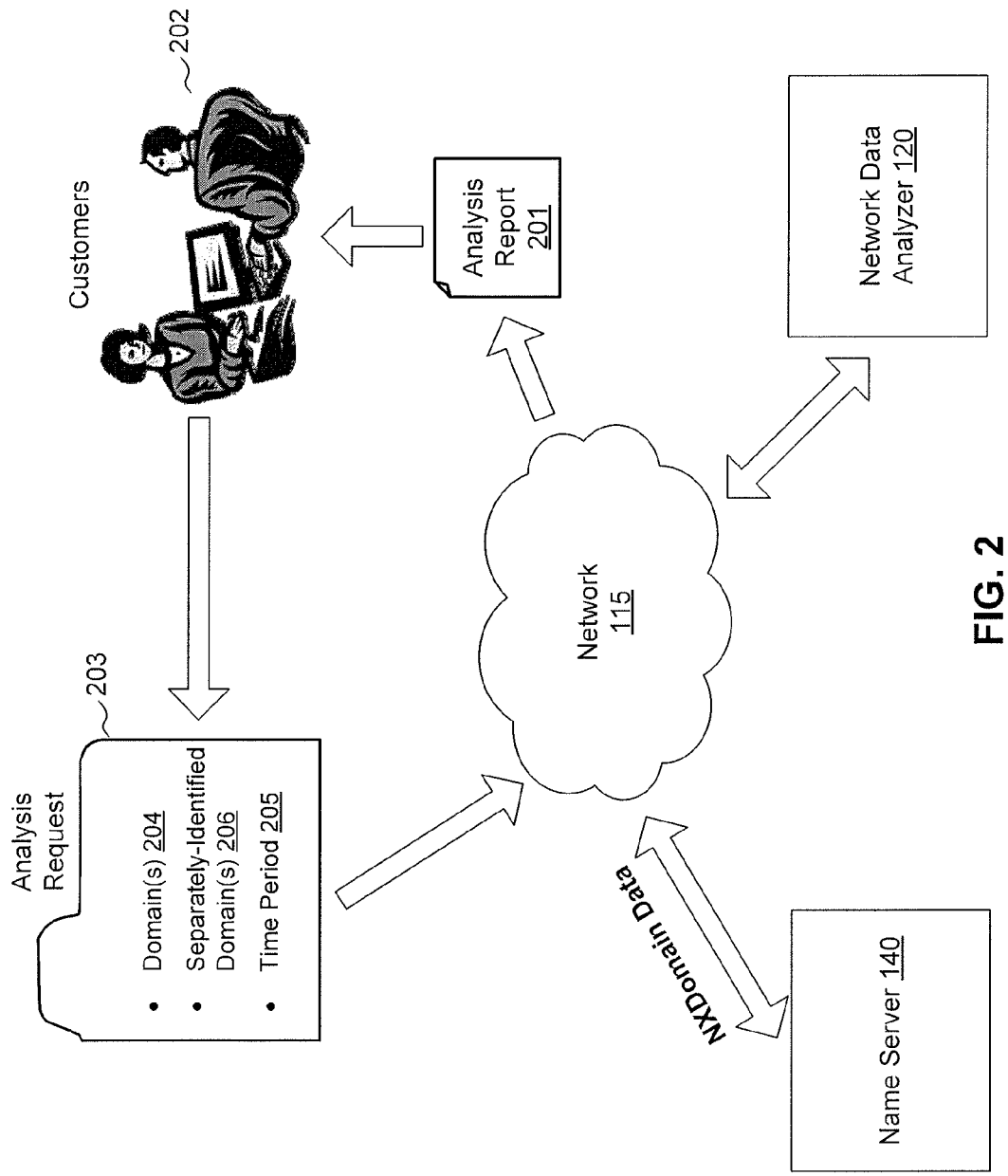
FIG. 2 is a diagram illustrating an exemplary data flow for collecting and analyzing network traffic information consistent with disclosed embodiments.

FIG. 2 is a diagram illustrating an exemplary data flow for collecting and analyzing network traffic information consistent with disclosed embodiments. Customers 202 may submit an analysis request 203 that includes at least one textual identifier, which may include, for example, identifiers of one or more domains 204. Analysis request 203 may separately identify one or more domains 206. Analysis request 203 may additionally include the identification of one or more previous time periods 205. The identified one or more previous time periods 205 may include a time period during which a separately-identified domain 206 existed as an NXD.

Analysis request 203 may take the format of a text file, comma-separated value (CSV) file, or any other file format capable of identifying domain names. Analysis request 203 may be communicated to network data analyzer server 120 via network 115, however, it may also be submitted by any number of available methods well known in the art including, for example, a website interface, software, or telephone interface.

Network data analyzer server 120 may communicate with name server 140 via network 115 and/or a direct communication link in order to, for example, access information associated with network traffic. Network data analyzer 120 may generate analysis results 201 and communicate them to customers 202 by any number of available methods such as, for example, electronic mail delivered over Network 115.

Figure 3:
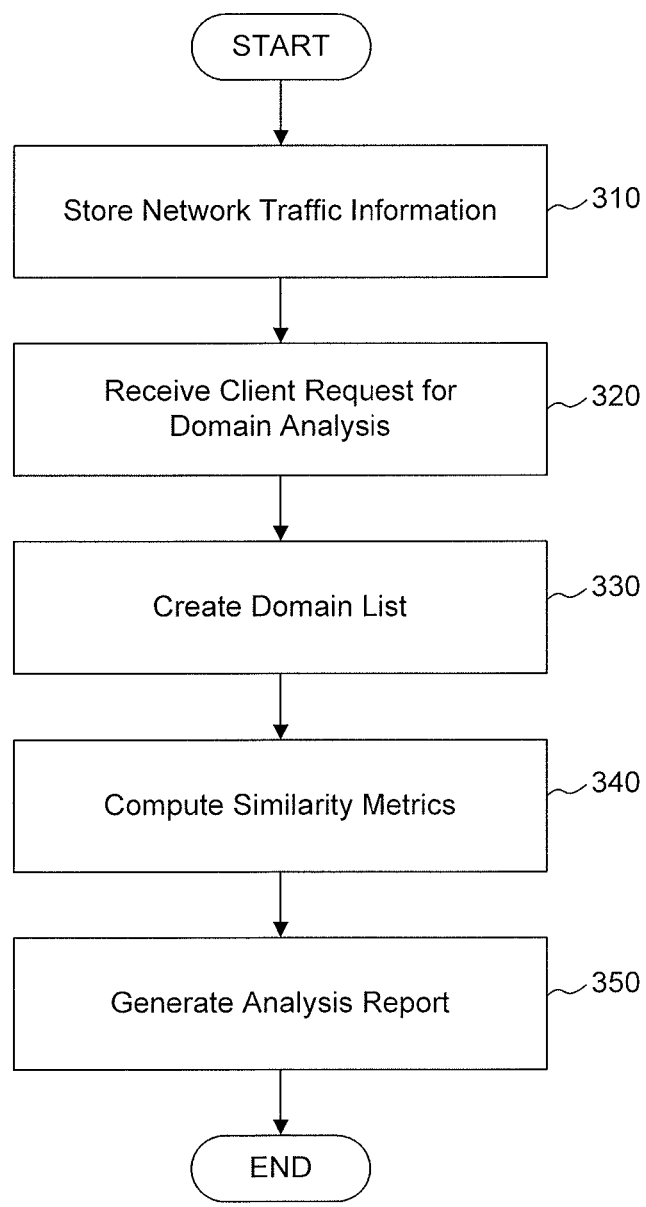
FIG. 3 is a flow diagram of a method for identifying potentially valuable NXD names, consistent with disclosed embodiments.

FIG. 3 is a flow diagram 300 of a method for identifying potentially valuable domain names, consistent with disclosed embodiments. In step 310, network traffic information may be stored by network traffic collection program 124 in memory 123 of network data analyzer server 120 or data repository 130. Alternatively, or additionally, name server 140 and/or other network devices may store the network traffic information utilized by network traffic collection program 124. The network traffic information may be associated with network requests from, for example, network devices 160. Network requests may include, among other things, DNS requests. In step 320, network data analyzer 120 may receive an analysis request 203 from customer 202. The analysis request may contain one or more textual identifiers associated with at least one domain 204, one or more separately-identified domains 206, and one or more previous time periods 205. Time period(s) 205 may include a time during which domain name 206 existed as an NXD.

In response to receiving analysis request 203, network data analyzer 120 may create a domain list in step 330 consisting of domains that have received network traffic. The domain list may consist only of domains receiving network traffic during previous time period(s) 205, based on the previous time period(s) 205 and the network traffic information collected by network traffic collection program 124. In step 340, the network data analyzer may compute similarity metrics for the one or more identified domains 204.

Similarity metrics may be computing using any number of available statistical methods well known in the art. The similarity metrics may constitute pre-computed hash values, fingerprints, or signatures. Alternatively, or additionally, the similarity metrics may be computed in response to analysis request 203. In this latter situation, the similarity metrics may represent the similarity between one or more domains 204 and separately-identified domain(s) 206, based on the network traffic information collected by network traffic collection program 124. Finally, the network data analyzer 120 may generate analysis report 201 in step 350 and return the analysis report 201 to the customer 202.

Figure 4:
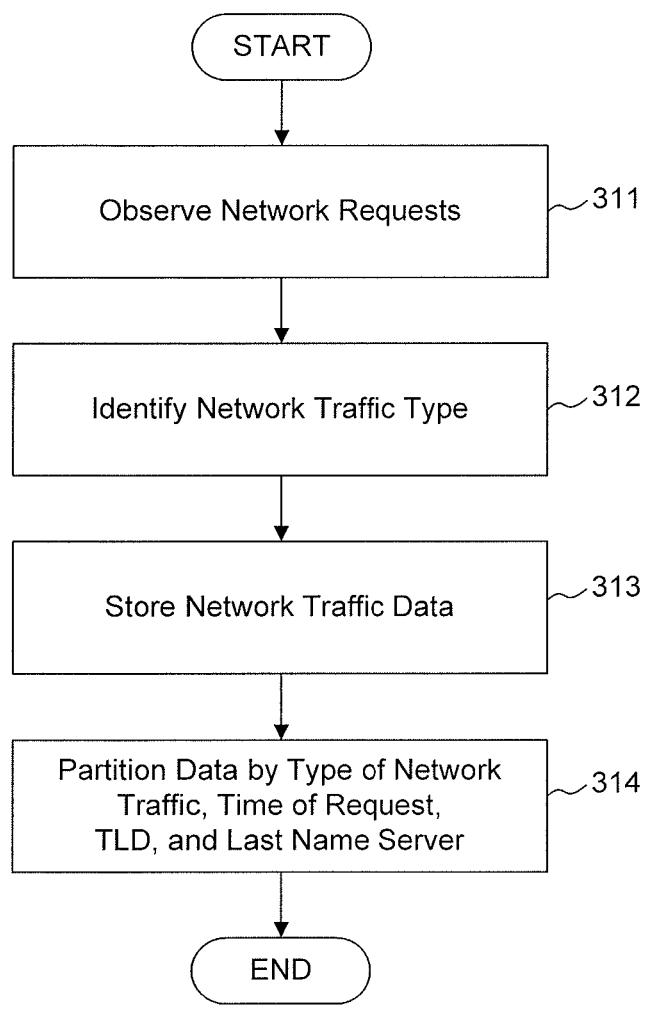
FIG. 4 is flow diagram of a method for collecting network traffic information, consistent with disclosed embodiments.

FIG. 4 is flow diagram of a method for storing network traffic information, consistent with disclosed embodiments, including step 310 of FIG. 3. In step 311, network requests are observed by the network data analyzer 102; name server 140; routers, switches, or other network devices; or any combination thereof. In step 312 the network requests are identified by type, such as, for example, a DNS request to an NXD or a DNS request to a registered domain name. In step 313, information associated with the identified network requests may be stored at, for example, data repository 130. In step 314, the information stored in step 313 may be partitioned by, for example, request type, time of request, top level domain, and/or the last name server making the DNS request.

Figure 5:
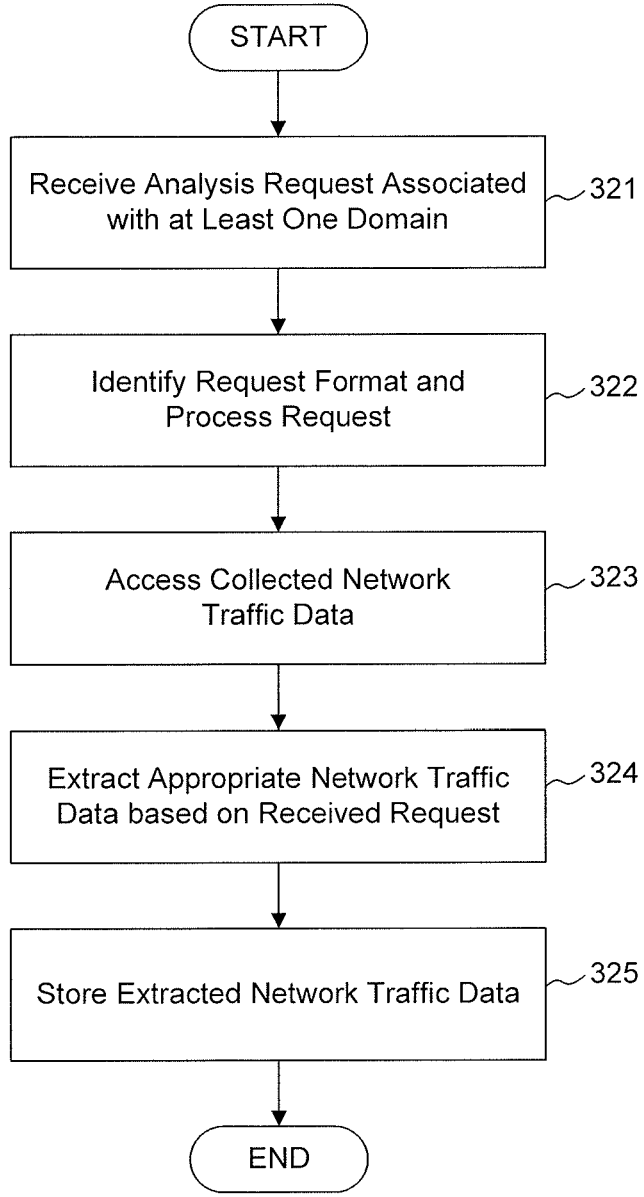
FIG. 5 is a flow diagram of a method for receiving requests for domain analysis, consistent with disclosed embodiments.

FIG. 5 is a flow diagram of a method for receiving requests for domain analysis, consistent with disclosed embodiments, including step 320 of FIG. 3. In step 321, analysis request 203 is received by network data analyzer server 120. The request may include at least one textual identifier associated with one or more domains 204. The analysis request 203 may additionally include an identification associated with one or more separately-identified domains 206 and/or previous time periods 205.

Analysis request 203 may take the format of a text file, CSV file, or any other file format capable of identifying a domain name. In step 322, the format of the received analysis request 203 is identified, allowing the network data analyzer server 120 to process the analysis request 203. In step 323, the network data analyzer server 120 accesses the network traffic information stored in step 310. In step 324, the network data analyzer server 120 extracts network traffic information associated with domain 204 identified in analysis request 203. Additionally, the network data analyzer server 120 may extract network traffic information associated with domain 204 and separately-identified domain 206 occurring only during the time period 205. Finally, in step 325, the network data analyzer 120 may store the extracted network traffic data in, for example, data repository 130, while maintaining the partitioning of the data that occurred in step 314.

Figure 6:
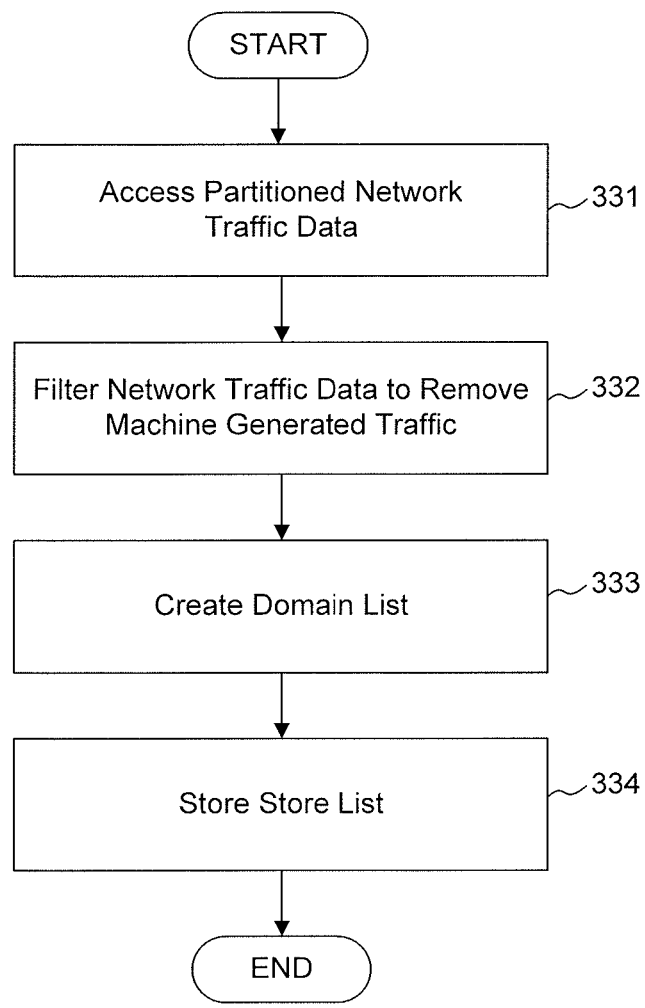
FIG. 6 is a flow diagram of a method for creating a domain list for analysis, consistent with disclosed embodiments.

FIG. 6 is a flow diagram of a method for creating an NXD list for a domain analysis, consistent with disclosed embodiments, including step 330 of FIG. 3. In step 331, the extracted network traffic data stored in step 325 is accessed by the network data analysis program 125. In step 332, program 125 filters the accessed data to remove network traffic associated with Internet bots, spiders, or other machine generated activity.

Machine-generated network traffic may be detected by observing the variance in the last name server making network requests to domain names over time. If the variance is determined to be lower than a threshold value, then the network traffic may be considered machine-generated. Alternatively, or additionally, the network traffic to domain names may be reviewed and analyzed to determine the number of overall network requests made per day by the requesting last name servers. If the number of overall requests made by a particular last name server exceeds a threshold value, all network traffic associated with that last name server may be considered machine-generated network traffic.

Machine-generated network traffic may also be associated with malware. Malware may be detected by reviewing network traffic to observe spikes in network traffic, such as DNS requests for an NXD, occurring during a period of time. Also, network traffic associated with malware may produce similar traffic patterns across name servers of a domain, such as an NXD. Thus, observing the network traffic to detect spikes in network traffic and/or similar traffic patterns across name servers of a domain provides for the detection of network traffic associated with malware, which may in turn be removed from consideration when analyzing network traffic for other purposes.

Continuing on to step 333, the network data analysis program 125 creates a domain list based on the filtered network traffic and analysis request 203. In step 334, the domain list is stored by the network data analysis program 125. Program 125 may store the list in, for example, data repository 130, storage 121, or memory 123.

Figure 7:
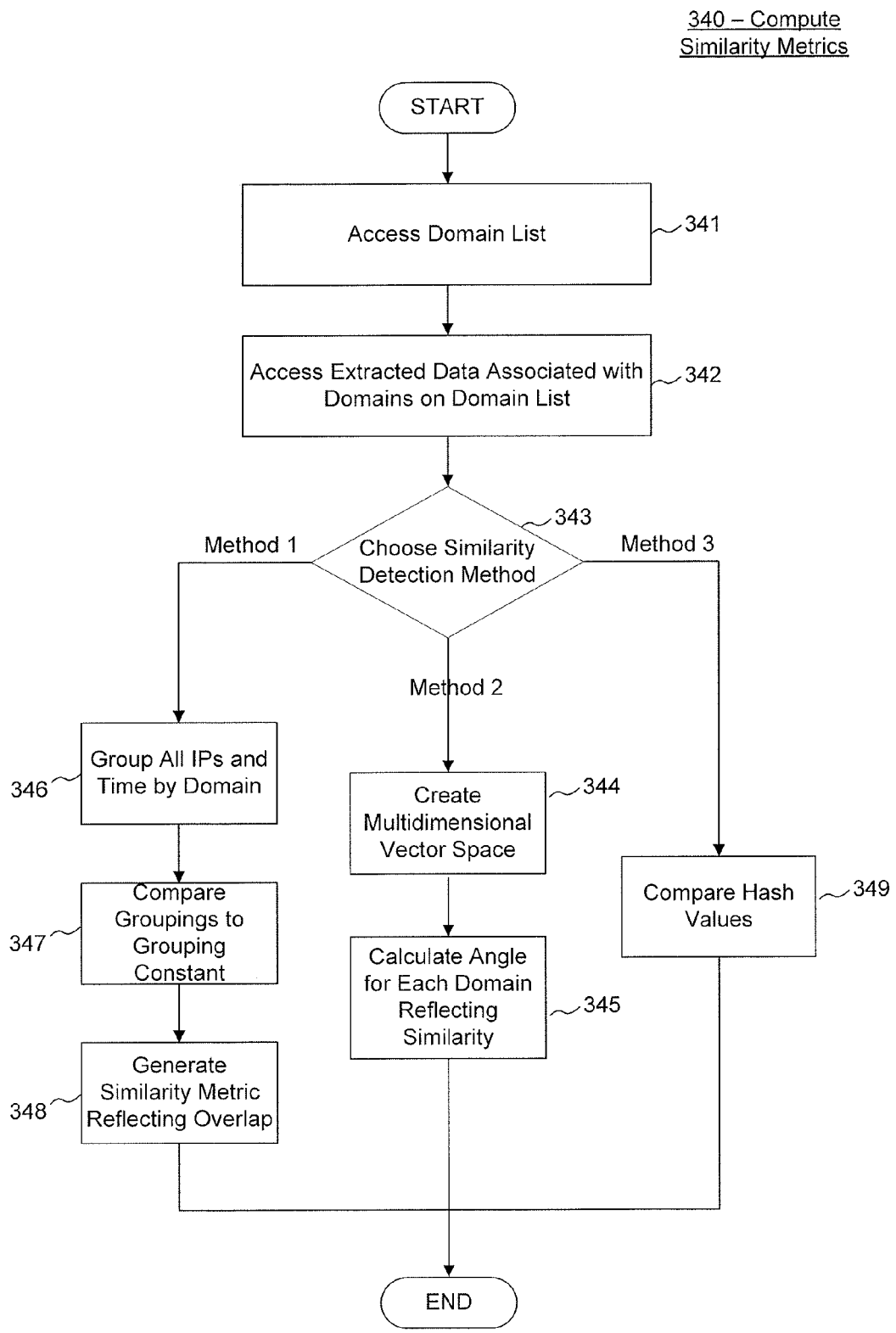
FIG. 7 is a flow diagram of a method for computing similarity metrics, consistent with disclosed embodiments.

FIG. 7 is a flow diagram of a method for computing similarity metrics, consistent with disclosed embodiments, including step 340 of FIG. 3. In step 341, network data analysis program 125 accesses the domain list. In step 342, program 125 accesses the information stored in step 325, i.e., extracted network traffic data associated with the domains found in the domain list. In step 343, a similarity detection method is selected based on at least one of: information provided in the analysis request 203, the timetable for providing customers 202 with the analysis report 201, the number of domains listed in the domain list, or the context of the analysis request.

In step 346, if the first method is selected, the IP addresses for each last name server making a network request for the domains listed in the domain list are grouped by domain. A grouping may also be made for separately-identified domain 206. The grouping for separately-identified domain 206 may include network traffic associated with the domain when it was an NXD. In step 347, each grouping may be compared to a constant, such as the grouping of one particular domain on the domain list or separately-identified domain 206. Finally, in step 348, similarity metrics are generated according to the amount of overlap between IP addresses in each grouping, the amount of overlapping IP addresses, as known in a Jaccard Similarity metric, indicating the degree to which the DNS traffic of each domain or NXD name resembles the DNS traffic of the grouping constant. Such a similarity metric may take a numerical representation, wherein a higher number indicates the network traffic is more similar. Alternatively, or additionally, the time the last name server made the request(s) may be considered by the network data analysis program in determining similarity.

Figure 9:
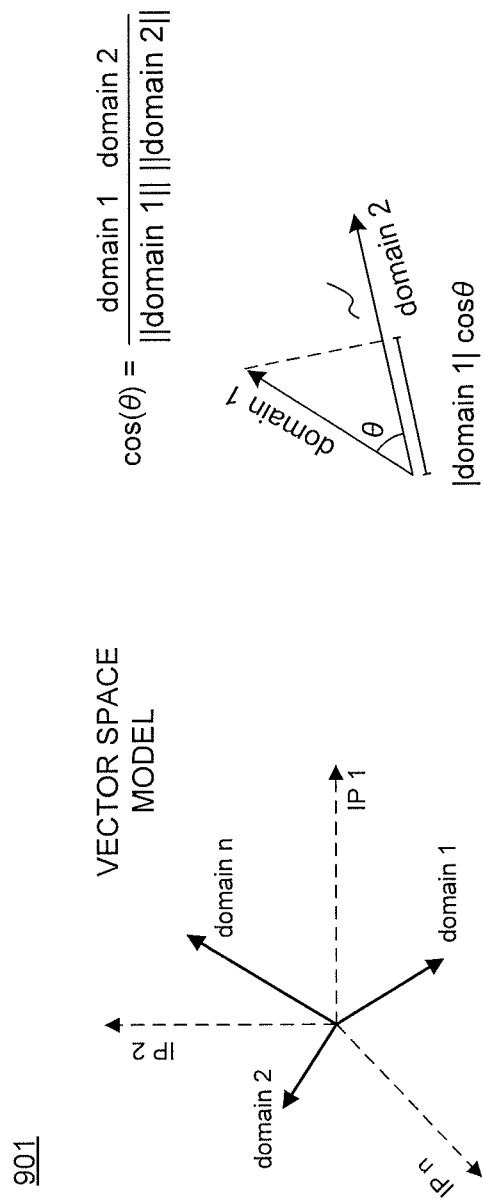
FIG. 9 is a diagram illustrating an exemplary vector space model for computing similarity metrics, consistent with disclosed embodiments.

In step 344, if the second method is selected, a multidimensional vector space may be created to show the relationship between the domain names found in the NXD list and/or separately-identified domain(s) 206. An exemplary multidimensional vector space consistent with disclosed embodiments may be found in FIG. 9. In such a multidimensional vector space, each IP address of the last name server making a network request for a domain constitutes a dimension. Alternatively, or additionally, the time the last name server made the request(s) may constitute a dimension. Thus, the similarity between domains is represented by the angle between the respective domain vectors, as indicated in FIG. 9. Accordingly, in step 345, a similarity metric between each domain in the domain list and/or separately-identified domain(s) 206 is computed by calculating the angle between their respective vectors, as shown in FIG. 9. In this representation of similarity, a lower angle indicates higher similarity.

Finally, if method 3 is chosen, pre-computed hash values for each domain in the domain list are compared in step 349 to a constant domain, such as a particular domain in the domain list or separately-identified domain(s) 206. In this representation of similarity, closer hash values indicate higher similarity.

Figure 8:
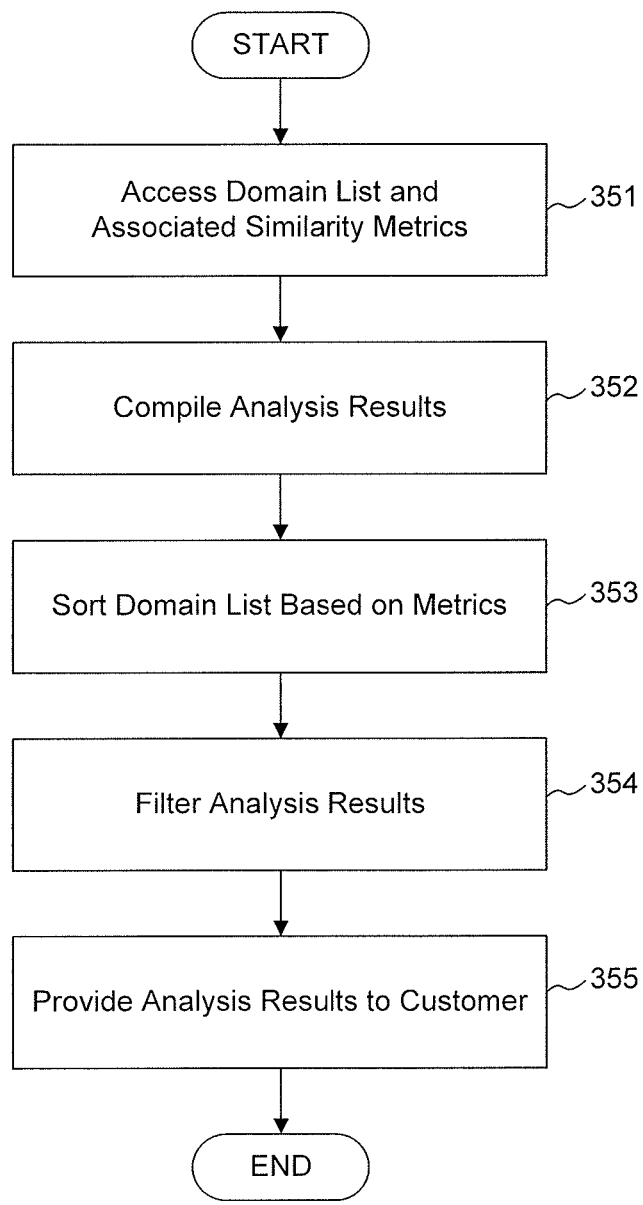
FIG. 8 is a flow diagram of a method for providing analysis results, consistent with disclosed embodiments.

FIG. 8 is a flow diagram of a method for providing analysis results 201, consistent with disclosed embodiments, including step 350 of FIG. 3. In step 351, the network data analysis program 125 accesses the stored domain list and computed similarity metrics associated with each domain in the domain list. Next, in step 352, analysis results 201 are compiled reflecting the information accessed in step 351. In step 353, the domain names listed in the analysis results 201 are sorted based on the accessed similarity metrics. For example, domains associated with similarity metrics indicating higher similarity may be placed higher in the list. In step 354, the analysis results 201 may be filtered. For example, domains associated with similarity metrics below a threshold value may be removed from the analysis results 201. Finally, in step 355, the analysis results 201 may be provided to customer 202.

FIG. 9 is a diagram illustrating an exemplary vector space model for computing similarity metrics, consistent with disclosed embodiments. Multidimensional vector space 901 may be created to show the relationship between domain names according to the similarity of a shared characteristic, such as the IP addresses of the last name server making a network request. In multidimensional vector space 901, each IP address of the last name server making a DNS request for a domain or NXD name constitutes a different dimension. Alternatively, or in addition, the time the last name server made the request(s) may constitute a dimension. Thus, the similarity between domains are represented by the angle between the respective vectors. In this representation of similarity, a lower angle indicates higher similarity.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A method, implemented using a computer, of analyzing network traffic related to domain names, comprising:
   storing network traffic data associated with Domain Name System (DNS) requests for non-existent domains (NXDs);
   receiving an analysis request associated with at least one domain name;
   creating, using the computer and based on the stored network traffic data, an NXD list comprising NXDs that received at least one DNS request during a time period;
   determining, using the computer and based on the stored network traffic data, a similarity metric that reflects a degree of similarity between the stored network traffic of the at least one domain name and the stored network traffic for an NXD listed in the NXD list; and
   providing an analysis report identifying one or more potentially valuable NXDs based on the similarity metric.

2. The method of claim 1, further comprising:
   observing network traffic data associated with DNS requests;
   identifying the type of domain associated with the DNS requests;
   partitioning the stored network traffic data according to the identified type of domain associated with the DNS request.

3. The method of claim 1, wherein the stored network traffic data is partitioned by at least one of the last name server making the DNS request or the time the DNS request was made.

4. The method of claim 1, further comprising:
   sorting NXDs listed in the analysis report based on the computed similarity metrics; and
   removing NXDs listed in the analysis report associated with similarity metrics below a threshold value.

5. The method of claim 1, wherein the stored network traffic data comprises at least the Internet Protocol (IP) address of a name server that last made the DNS request and a time at which the DNS request occurred.

6. The method of claim 1, wherein a root name server for a top-level domain stores the network traffic data.

7. The method of claim 1, wherein the time period includes a time period that the at least one domain name was an NXD.

8. The method of claim 1, further comprising:
   filtering the stored network traffic data to remove network traffic data associated with machine-generated activity.

9. The method of claim 1, the determining further comprising:
   comparing a metric for each NXD to a metric associated with the DNS traffic of the at least one domain name when the at least one domain name was an NXD; and
   selecting a subset of the NXD list based on the comparison; and
   wherein the analysis report comprises the selected subset and the computed similarity metrics associated with NXDs of the selected subset.

10. The method of claim 1, further comprising:
    prioritizing the list of NXDs based on the similarity metrics.

11. The method of claim 1, wherein the similarity metrics are pre-computed as hash values depicting a DNS traffic signature of each NXD.

12. A computer system for analyzing network traffic related to domain names, comprising:
    a processing system comprising one or more processors; and
    a memory system comprising one or more computer-readable media, wherein the computer readable media store instructions that, when executed by the processing system, cause the system to perform operations comprising:
    storing network traffic data associated with Domain Name System (DNS) requests for non-existent domains (NXDs);
    receiving an analysis request associated with at least one domain name;
    creating, based on the stored network traffic data, an NXD list comprising NXDs that received at least one DNS request during a time period;
    determining, based on the stored network traffic data, a similarity metric that reflects a degree of similarity between the stored network traffic of the at least one domain name and the stored network traffic of an NXD listed in the NXD list; and
    providing an analysis report identifying one or more potentially valuable NXDs based on the similarity metric.

13. The system of claim 12, wherein the computer-readable media further stores instructions for:
    observing network traffic data associated with DNS requests;
    identifying the type of domain associated with the DNS requests; and partitioning the stored network traffic data according to the identified type of domain associated with the DNS request.

14. The system of claim 12, wherein the stored network traffic data is partitioned by at least one of: the last name server making the DNS request or the time the DNS request was made.

15. The system of claim 12, wherein the computer-readable media further stores instructions for:
sorting NXDs listed in the analysis report based on the computed similarity metrics; and
removing NXDs listed in the analysis report associated with similarity metrics below a threshold value.

16. The system of claim 12, wherein the stored network traffic data comprises at least the Internet Protocol (IP) address of a name server that made the DNS request and a time the DNS request occurred.

17. The system of claim 12, wherein a root name server for a top-level domain stores the network traffic data.

18. The system of claim 12, wherein the time period includes a time period that the at least one domain name was an NXD.

19. The system of claim 12, wherein the computer-readable media further stores instructions for:
filtering the stored traffic data to remove traffic data associated with machine-generated activity.

20. The system of claim 12, wherein the determining operation comprises:
comparing a metric for each NXD to a metric associated with the DNS traffic of the at least one domain name when the at least one domain name was an NXD; and
selecting a subset of the NXD list based on the comparison; and
wherein the analysis report comprises the selected subset and the computed similarity metrics associated with NXDs of the selected subset.

21. The system of claim 12, wherein the computer-readable media further stores instructions for:
prioritizing the list of NXDs based on the similarity metrics.

22. The system of claim 12, wherein the similarity metrics are pre-computed as hash values depicting a DNS traffic signature of each NXD.

* * * * *